(12) United States Patent
Kammerl et al.

(10) Patent No.: US 9,455,658 B2
(45) Date of Patent: Sep. 27, 2016

(54) ON-LOAD TAP CHANGER

(71) Applicant: MASCHINENFABRIK REINHAUSEN GMBH, Regensburg (DE)

(72) Inventors: Herbert Kammerl, Wolfsegg (DE); Alfred Bieringer, Geiselhoering (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 127 days.

(21) Appl. No.: 14/401,792

(22) PCT Filed: Apr. 19, 2013

(86) PCT No.: PCT/EP2013/058189
§ 371 (c)(1),
(2) Date: Nov. 17, 2014

(87) PCT Pub. No.: WO2013/185961
PCT Pub. Date: Dec. 19, 2013

(65) Prior Publication Data
US 2015/0171783 A1 Jun. 18, 2015

(30) Foreign Application Priority Data
Jun. 14, 2012 (DE) .................. 10 2012 105 152

(51) Int. Cl.
| H01F 21/12 | (2006.01) |
| G05F 1/14 | (2006.01) |
| H01H 21/00 | (2006.01) |
| G05F 1/325 | (2006.01) |
| G05F 1/33 | (2006.01) |
| G05F 1/12 | (2006.01) |
| H02P 13/06 | (2006.01) |
| H01H 9/00 | (2006.01) |

(52) U.S. Cl.
CPC ............ *H02P 13/06* (2013.01); *H01H 9/0027* (2013.01); *H01H 9/0044* (2013.01); *H01H 9/0038* (2013.01)

(58) Field of Classification Search
CPC H01F 29/04; H01H 33/6661; H01H 9/0011; H01H 9/0016; H01H 2033/6667; H02P 13/06
USPC ......... 336/150; 323/250, 251, 255, 256, 264
See application file for complete search history.

(56) References Cited

U.S. PATENT DOCUMENTS

| 1,985,927 | A | | 1/1935 | Jansen | |
| 3,581,188 | A | * | 5/1971 | Watanabe | ............... H01F 27/40 323/340 |
| 3,614,597 | A | * | 10/1971 | Van Riemsdijk | .... H01H 9/0005 200/11 TC |

(Continued)

FOREIGN PATENT DOCUMENTS

| DE | 19847745 B | 1/2000 |
| DE | 19855860 B | 2/2000 |
| GB | 2014794 A | 8/1976 |

*Primary Examiner* — Tsz Chan
(74) *Attorney, Agent, or Firm* — Andrew Wilford

(57) ABSTRACT

The invention relates to an on-load tap changer for switching among different winding taps of a step transformer without interruption. According to the invention, the selector contact unit (7) and the switching means (16, 17) for switching the load without interruption are jointly actuated without using an intermediate energy accumulator, by means of a threaded spindle (5) which is rotated by a drive motor (2) during a switching operation.

9 Claims, 1 Drawing Sheet

(56) References Cited

U.S. PATENT DOCUMENTS

| | | | | |
|---|---|---|---|---|
| 3,643,154 A | * | 2/1972 | Van Riemsdijk | H01H 9/0005 200/11 TC |
| 3,662,253 A | * | 5/1972 | Yamamoto | H01F 29/04 323/343 |
| 3,743,921 A | * | 7/1973 | Legg | G05F 1/20 315/219 |
| 4,081,741 A | * | 3/1978 | Palmer | H01H 9/0005 323/340 |
| 5,523,674 A | * | 6/1996 | Dohnal | H01H 9/0038 200/11 TC |
| 7,463,010 B2 | | 12/2008 | Dohnal | |
| 2012/0139510 A1 | | 6/2012 | Wrede | |
| 2012/0249277 A1 | * | 10/2012 | Kraemer | H01F 29/04 336/145 |
| 2013/0213777 A1 | | 8/2013 | Dohnal | |

* cited by examiner

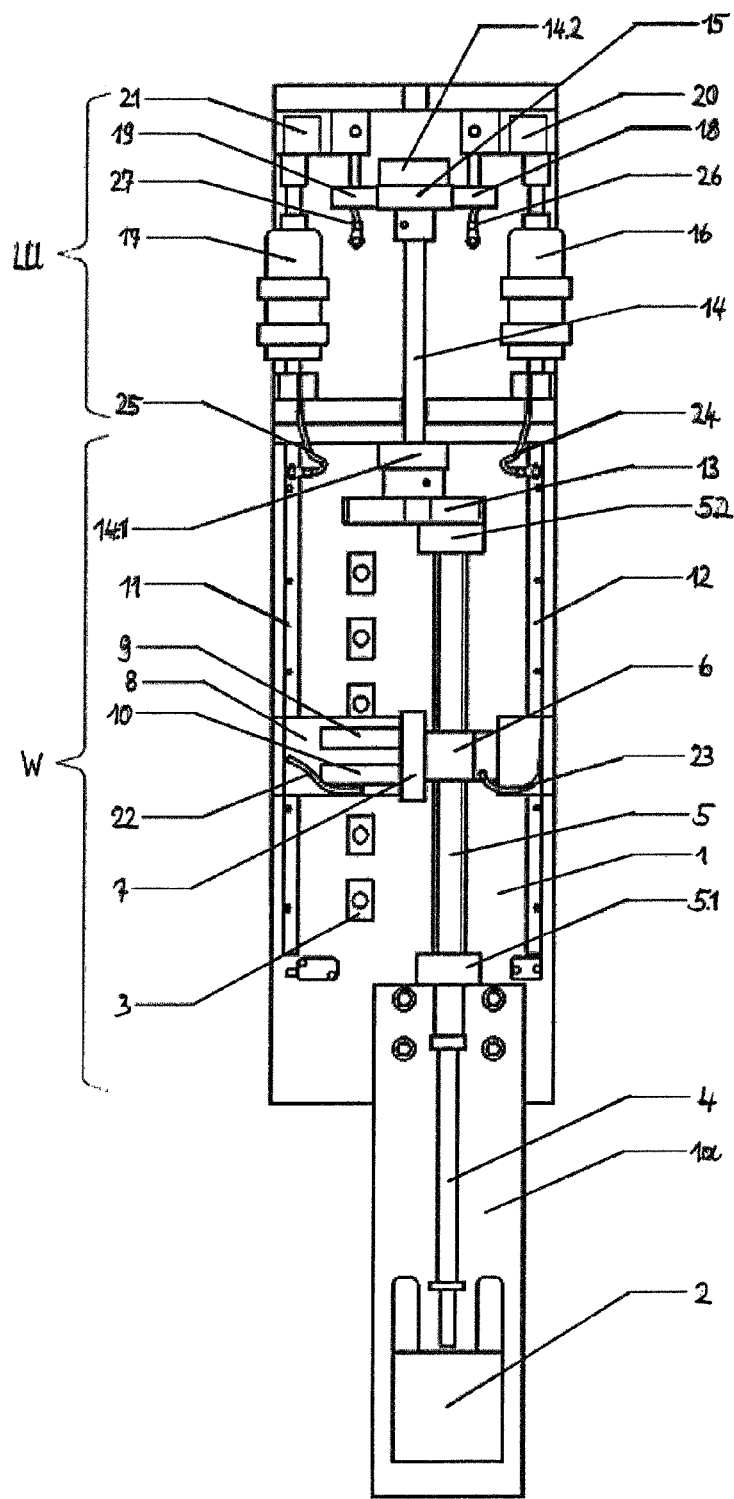

ON-LOAD TAP CHANGER

CROSS REFERENCE TO RELATED APPLICATIONS

This application is the US-national stage of PCT application PCT/EP2013/058189 filed 19 Apr. 2013 and claiming the priority of German patent application 102012105152.6 itself filed 14 Jun. 2012.

The present invention relates to an on-load tap changer for uninterrupted switching between different winding taps of a tapped transformer according to the preamble of the first claim.

On-load tap changers have been in use worldwide in large numbers for many years for uninterrupted switching between different winding taps of tapped transformers. So-called reactor switches that are widespread particularly in North America, have a switch-over reactance enabling a slow, continuous switching over. On-load tap changers according to the resistance fast-switching principle usually consist of a selector for power-free selection of the respective winding tap of the tapped transformer that is to be switched over to and a load changeover switch for the actual switching from the previous to the new, preselected winding tap. The load changeover switch usually has switching contacts and resistance contacts for that purpose. The switching contacts in that case serve for direct connection of the respective winding tap with the load diverter and the resistance contacts for temporary connection, i.e. bridging over by one or more switch-over resistances. However, developments in recent years have led away from load changeover switches with mechanical switching contacts in insulating oil. Instead, vacuum interrupters are increasingly used as switching elements.

An on-load tap changer of that kind with vacuum interrupters is disclosed in, for example, DE 10 2009 043 171 [US 2012/0139510]. Here, a load changeover switch carries a drive shaft that is drivable by a force-storing unit, with at least one cam disk. The cam disk has a plurality of control cams, wherein two control cams arranged at the end at the cam disk have a contour, which departs from a circular shape, in the form of lobes, at which is guided with maintained contact a respective roller that is connected by a rocker lever with a vacuum interrupter and that track the profiled contour of the respective control cam.

In a special category of on-load tap changers, the so-called load selectors, the described means for selection of a new winding tap and the means for actual load switching-over are constructionally combined and actuated in common. Tap changers according to the principle of resistance fast switching for uninterrupted switching from one winding tap of a tapped transformer to another are usually constructed so that the is respective fixed tap contacts electrically connected with the output lines of the tap windings are circularly arranged at an insulating-material structure or cylinder in one or more horizontal planes and are connectable by rotatable contact bridges actuated by concentric drive shafts. In the case of load selectors in which the tap selection and the actual load changeover are combined, actuation of the contact bridges in that case takes place abruptly after triggering of a force-storing unit, usually spring force-storing unit, drawn up by the drive shaft of the changer.

In departure from these usual constructions a tap changer with linear contact actuation is described in DE 42 37 165 [U.S. Pat. No. 5,523,674], wherein the fixed tap contacts extend along a path in the interior of the changer and are connectable by a displaceable switching mechanism that is in turn driven by the drive shaft. In that case, the vertically displaceable switching mechanism consists of a draw-up slide that is continuously drivable by the drive shaft and that preselects the new, fixed tap contact, and a drive output part that can be drawn up by the draw-up slide by a force-storing unit and that after triggering abruptly runs after the draw-up slide and in that case executes the actual load changeover from the previous tap of the tapped winding to the preselected new tap. The switching elements required for that purpose are a component of the drive output part.

A further on-load tap changer, which is attributable to the applicant, with linearly arranged selector contacts has become known from DE 198 47 745. Disposed above the selector contacts, thus in a separate location, are the stationary vacuum interrupters, which are associated with the respective selector contacts of each phase, for the actual, abrupt load changeover. Necessary for actuation of this on-load tap changer is a spring force-storing unit that during its draw-up movement actuates the selector contacts and drives the vacuum switching elements by its abrupt drive output movement.

Regardless of the constructional format of the on-load tap changer, thus with rotating or linearly movable contact system, on-load tap changers known from the prior art need a spring force-storing unit for the abrupt switching by the contact system. Force-storing units known from the prior art are, at the start of each actuation of the on-load tap changer, drawn up, i.e. stressed, by a drive shaft. The known force-storing units usually consist of a draw-up carriage and a jump carriage, between which force-storing unit springs as force-storing units are arranged. Force-storing units of that kind are evident from, for example, DE 198 55 860 and DE 28 06 282 [GB 2,014,794].

An initial, slow rotational movement of the drive shaft is used in order to translationally draw up a draw-up slide so as to subsequently translate the in turn translational movement of the jump slide, thus the drive output part, into a rotational main movement of the drive output shaft and into an actual contact actuation connected therewith. This complicated conversion of rotation into a translational movement and back again into rotation requires a large amount of space of the force-storing unit construction within the on-load tap changer and, in addition, a multiplicity of complex individual subassemblies.

It is therefore the object of the present invention to indicate an on-load tap changer that dispenses with the complicated construction of a force-storing unit and thus offers a significantly simplified constructional format with, at the same time, increased operational reliability.

This object is fulfilled by an on-load tap changer for uninterrupted switching between different winding taps of a tapped transformer with the features of the first claim. The subclaims in that case relate to particularly advantageous developments of the invention.

The general inventive idea consists of actuating not only the selector contact unit, but also the switching means for the uninterrupted load switching by a common motor drive by a threaded spindle arrangement without interposition of a force-storing unit. According to a further feature of the invention the threaded spindle directly driven by the motor drive directly actuates the selector contacts by a spindle nut running thereon as well as, advantageously by way of an intermediate transmission, a cam arrangement that in turn acts on the switching means of the load changeover switch and actuates this for uninterrupted switching between the two selector contacts in a switching sequence specific to the equipment. With particular advantage, vacuum interrupters are used as switching means of that kind.

According to a preferred form of embodiment of the invention the movable selector contacts are each received in a contact carrier and so co-operate with fixed selector contacts arranged at a support plate that the individual fixed selector contacts are connectable by a longitudinal displacement of the movable selector contacts as a component of a common selector contact unit, which is mechanically connected with the spindle nut, in longitudinal direction of the threaded spindle. Through the movement back and/or forth of the selector contact unit the individual fixed selector contacts are connected and thus run through the regulating range of the on-load tap changer.

The invention shall be explained in more detail in the following by way of example, wherein:

FIG. 1 shows an on-load tap changer according to the invention in schematic illustration from above.

The basic supporting element for the entire on-load tap changer is a support plate 1 of insulating material. Fastened directly on the support plate 1 or, as shown here, a separate, further support plate 1a is an electric drive motor 2, for example a three-phase asynchronous motor or also a torque motor or also a stepper drive. Fixed selector contacts 3 are arranged at respectively the same spacing from one another on the support plate 1 along a linear path that is indicated in the figure by a dot-dashed line. Each of these electrically conductive selector contacts 3 is electrically connected with a winding tap, which is to be connected by the on-load tap changer, of the regulating winding of the tapped transformer.

The already mentioned drive motor 2 drives an insulating shaft 4 that in turn is coaxially connected with a threaded spindle 5. It is also possible within the scope of the invention for the drive motor 2 to directly drive the threaded spindle 5, which is is usually metallic, but for reasons of voltage strength the described introduced insulating shaft 4 is useful in most cases.

The threaded spindle 5 extends parallel to the path of the fixed selector contacts 3. It is rotatably mounted at two bearing blocks 5.1 and 5.2 and fixed in its position.

Running on the threaded spindle 5 is a spindle nut 6 that in turn carries a selector contact unit 7 that is moved together with the spindle nut 6 in longitudinal direction, i.e. the direction of the dot-dashed line, in both directions when the threaded spindle 5 rotates. A contact carrier 8 of insulating material is fixedly arranged on the selector contact unit 7 and in turn carries two movable selector contacts 9 and 10. The term "movable" means that the two selector contacts 9 and 10 are fastened on the contact carrier 8 fixedly and fixed in their spacing from one another and are moved together with this in longitudinal direction when the threaded spindle 5 rotates.

The two movable selector contacts 9 and 10 are geometrically dimensioned in such a manner that they electrically connect—depending on setting—fixed selector contacts 3.

The spacing between the two parallel movable selector contacts 9, 10 and the length of the fixed selector contacts 3 are so dimensioned that not only a connection of two adjacent fixed selector contacts (bridging connection) by a respective one of the movable selector contacts 9 or 10, but also resting in common of the two movable selector contacts 9 and 10 on one of the fixed selector contacts 3, is possible.

Contact and guide rails 11 and 12 of electrically is conductive material are disposed on the support plate 1 parallel to one another and not only parallel to the path of the fixed selector contacts 3, but also parallel to the threaded spindle 5 along the illustrated dot-dashed line and have a double function: On the one hand they ensure mechanical guidance of the longitudinally movable selector contact unit 7. On the other hand they serve for electrical connection of the movable contacts 9, 10 of the selector W of the on-load tap changer with respect to the switching elements of the load changeover switch LU of the on-load tap changer; this is explained in more detail further below.

The threaded spindle 5 is mechanically connected at its end remote from the drive motor 2 with a transmission 13, the other side of which has a further, rotatable insulating shaft 14 that is rotatably mounted by two further bearing blocks 14.1 and 14.2 and fixed in its position.

A cam disk 15 (or a similar control device of comparable functionality) is fixedly arranged on the insulating shaft 14.

The switching means of the load changeover switch LU, here two vacuum interrupters 16 and 17, are arranged on both sides of the insulating shaft 14. Actuation of each of the interrupters is effected by a respective cam roller 18 or 19 running on a contour of the cam disk 15.

It is possible within the scope of the invention for two cam rollers 18, 19 to run on the same (single) contour, for example on the end; it is equally possible to provide a separate contour on the cam disk 15 for each of the cam rollers 18 and 19.

Transmission of the movement of the cam rollers 18, 19 running on the cam disk 15 is effected by deflecting levers 20, 21 to the movable plungers respectively of the vacuum interrupters 16 and 17.

It is also possible to provide more than one cam disk of that kind. Thus, for example, each vacuum interrupter could have an individual cam disk for actuation thereof.

It is also possible within the scope of the invention to provide other switching elements, for example mechanical contacts, instead of the vacuum interrupters.

Through the explained transmission 13 it is possible in simple manner to provide a first specific rotational speed of the threaded spindle 5 for actuation of the selector W and thus of the selector contacts 9, 10 from one operational setting to the adjacent, next operational setting through movement of the selector contact unit 7 and in addition to provide a second, specific rotational speed per load changeover for the cam disk 15. It is also possible within the scope of the invention to geometrically dimension fixed selector contacts 3, movable selector contacts 9, 10 of the selector W and cam disk 15 of the load changeover switch LU in such a manner that the threaded spindle 5 rotated by the drive motor 2 directly actuates the said components in translation-free manner without interposition of a transmission.

The electrical connection of each of the movable (in common) selector contacts 9 and 10 with a respective one of the two contact and guide rails 11 and 12 is effected by a respective electrical line 22, 23. The electrical connection of these two contact and guide rails 11 and 12 with respect to the vacuum interrupters 16, 17 is effected by further electrical lines 24, 25. Finally, the electrical connection of the other side of the vacuum interrupters 16, 17 with respect to the load diverter (not illustrated) is carried out by way of further electrical lines 26, 27.

The functioning of the on-load tap changer according to the invention is as follows: It was already explained further above that not only the contacting of the same fixed selector contact 5 by the two movable selector contacts 9, 10, but also the bridging contacting of two adjacent fixed selector contacts 5 by a respective one of the movable selector contacts 9 and 10 are permissible, stationary operational settings. In the embodiment shown in FIG. 1 the selector W has six fixed selector contacts 3; eleven stationary states in total thus result. In other words: eleven different voltages are settable.

At the start of a load changeover the drive motor 2 is electrically energized; the threaded spindle 5 rotates. Thus, depending on the direction of rotation of the threaded spindle 5 the selector contact unit 7 with contact carrier 8 and the two movable selector contacts 9, 10 displaces upwardly or downwardly, i.e. in the direction 'higher' or 'lower' of the voltage regulation. These change, with each switching-over, from a bridging to a non-bridging setting and conversely. At the same time the insulating shaft 14 and, with it, the cam disk 15 are rotated, with particular advantage—by virtue of the intermediate transmission 13—through an angle of 180 or even 360 degrees.

As a consequence, the cam rollers 18, 19 are deflected; this movement is utilized by way of the deflecting levers 20, 21 for actuation of the vacuum interrupters 16, 17.

In that case and specific to the switching, the load current commutates from the original position of the movable selector contacts 9, 10 to the new position thereof.

The switching is complete; the drive motor 2 is stopped by suitable control and/or braking means that are familiar to the expert and not illustrated here.

The on-load tap changer according to the invention is of extremely simple and compact construction and operates without a force-storing unit. Not only the selector W, but also the load changeover switch LU are actuated by a single rotational movement of an activated electric motor.

Due to its very compact mode of construction and the extremely small requirement for space it is advantageously possible to arrange the on-load tap changer according to the invention in the interior of the tapped transformer in single-phase modules directly in the region of the respective winding, at the core thereof or at other suitable places within the oil tank of the transformer.

Arrangements of that kind have, in principle, been proposed in DE 20 2010 011 521 U1, DE 20 2010 011 524 U1 and, particularly, DE 20 2010 012 811 U1. The technical realization thereof previously failed due to the large space requirement of the known on-load tap changers with their usually circular rod arrangements or insulating cylinders that adapt only poorly to the geometric profile of the available space at the cores. Apart from the profile, the known on-load tap changers with the complex force-storing units thereof are also not suitable, from the aspect of vertical dimension, for these already proposed cases of use.

The invention discloses a suitable on-load tap changer for innovative applications of that kind.

The invention claimed is:

1. An on-load tap changer for uninterrupted switching between different winding taps of a tapped transformer, consisting of a selector and a load changeover switch, wherein
the selector has fixed selector contacts that are respectively electrically connected with the individual winding taps and that are arranged along a linear path,
the fixed selector contacts are selectably connectable by two longitudinally displaceable, movable selector contacts of the selector,
switching elements are provided in the load changeover switch for uninterrupted switching for each phase,
a motor drive with a drive motor for introduction of switching process of the on-load tap changer is provided,
the two movable selector contacts of the selector and the switching means of the load changeover switch are, for the uninterrupted switching, so directly actuatable by the drive motor that the introduction of the drive movement of the drive motor to the movable selector contacts, and
the switching means for the uninterrupted switching takes place without interposition of a force-storing unit.

2. The on-load tap changer according to claim 1, wherein rotation produced by the drive motor of the motor drive is directly transmissible to a threaded spindle and that not only the movable selector contacts, but also the switching means are, for the uninterrupted switching, actuatable by the rotating threaded spindle.

3. The on-load tap changer according to claim 2, wherein a spindle nut is guided on the threaded spindle to be displaceable in the direction of the linear path and that the spindle nut carries a selector contact unit, on which the movable selector contacts are fastened firmly and fixed in their spacing from one another and are actuatable in common with the selector contact unit.

4. The on-load tap changer according to claim 1, wherein the spacing between the two parallel movable selector contacts and the length of the fixed selector contacts are so dimensioned that not only a connection of two adjacent fixed selector contacts by a respective one of the movable selector contacts, but also a resting in common of two movable selector contacts on one of the fixed selector contacts are possible.

5. The on-load tap changer according to claim 1, wherein the on-load tap changer is arranged on a support plate, that contact and guide rails of electrically conductive material are disposed on the support plate parallel to one another and not only parallel to the path of the fixed selector contacts, but also parallel to the threaded spindle longitudinally of the path, which rails on the one hand ensure mechanical guidance of the longitudinally movable selector contact unit and on the other hand serve for electrical connection of the movable contacts of the selector of the on-load tap changer with respect to the switching elements of the load changeover switch.

6. The on-load tap changer according to claim 1, wherein the switching elements are vacuum interrupters that the actuation thereof is effected by cam rollers that co-operate with at least one contour of at least one cam disk, and that the at least one cam disk is mechanically connected with the threaded spindle.

7. The on-load tap changer according to claim 6, wherein the at least one cam disk is mechanically connected with the threaded spindle by way of an intermediate transmission.

8. The on-load tap changer according to claim 5, wherein the electrical connection of each one of the movable selector contacts with a respective one of the two contact and guide rails is effected by a respective electrical line, that the electrical connection of these two contact and guide rails with respect to the vacuum interrupters is effected by further electrical lines and that finally the electrical connection of the other side of the vacuum interrupters with respect to a load diverter is effected by yet further electrical lines.

9. The on-load tap changer according to claim 1, wherein the on-load tap changer is arranged in the interior of the tapped transformer in single-phase modules directly in the region of the respective winding, at the core thereof or at other suitable places within the oil vessel of the transformer.

* * * * *